United States Patent [19]

Dietrich et al.

[11] 4,141,057
[45] Feb. 20, 1979

[54] PHOTO FLASH DEVICE

[75] Inventors: Rolf Dietrich, Hofheim; Wolfgang Eisinger, Oberursel; Hans E. Heintke, Wächtersbach; Hans Karey, Frankfurt; Robert Oberheim, Liederbach, all of Fed. Rep. of Germany

[73] Assignee: Braun AG, Frankfurt am Main, Fed. Rep. of Germany

[21] Appl. No.: 831,333

[22] Filed: Sep. 7, 1977

[30] Foreign Application Priority Data

Sep. 8, 1976 [DE] Fed. Rep. of Germany ....... 2640162

[51] Int. Cl.$^2$ ............................................. G03B 15/02
[52] U.S. Cl. ..................... 362/18; 362/281; 362/300; 362/303; 362/311; 362/346
[58] Field of Search ..................... 362/16, 17, 18, 281, 362/311, 282, 346, 300, 303

[56] References Cited

U.S. PATENT DOCUMENTS 2,587,423   2/1952   Young ................................. 362/303

Primary Examiner—Stephen J. Lechert, Jr.
Attorney, Agent, or Firm—Michael J. Striker

[57] ABSTRACT

A reflector of a photo flash device bounds a space for a light source. The space has an open side across which a light-transmissive shield extends that permits light from the source to issue through the opening at a first angle of emergence. A wide-angle light-transmissive shield is hinged to a frame of the first-mentioned shield and can be swung into and out of an operating position in which it is located in front of the first-mentioned shield and causes the issuing light to emerge at a larger angle of emergence. This permits a user to increase or decrease the area which he wishes to have illuminated when the device is operated.

11 Claims, 8 Drawing Figures

Fig. 5
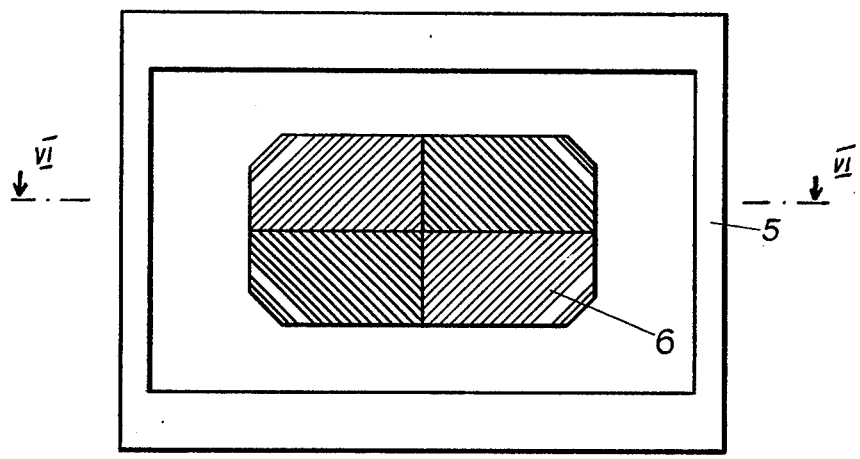
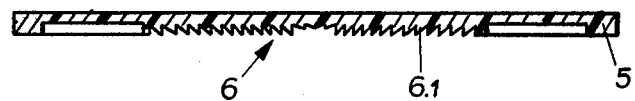
Fig. 6
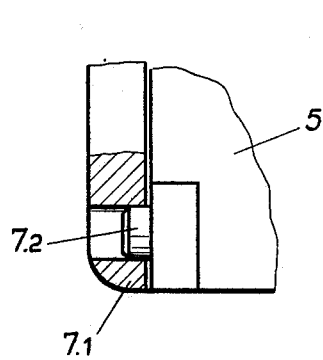
Fig. 7
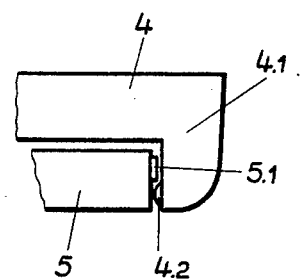
Fig. 8

PHOTO FLASH DEVICE

BACKGROUND OF THE INVENTION

Field of the Invention

The present invention relates to photo flash devices.

More particularly, the invention relates to a photo flash device which enables a user, at his option, to select differently-sized areas which are to be illuminated.

The Prior Art

Photo flash devices have a reflector which bounds a space wherein a light source (e.g. flash tube) is mounted. This space has an opening or open side through which the light emerges which is produced by operation of the light source. These devices are too well known per se to require any detailed description.

As a rule, the size of the area which is illuminated when the photo flash device is operated, is fixed and adjustments are not possible. However, there are times when it is desired, especially by a serious photographer, to be able to increase or decrease the size of the illuminated area. To make this possible it has been proposed to provide a wide-angle light-transmissive shield which is clipped onto the normal light-transmissive shield whenever it is desired to increase the size of the illuminated area. This has various disadvantages. The user must separately carry the wide-angle shield about with him, which many persons consider to be an inconvenience. The clip-on connection is unreliable and quite readily permits the wide-angle shield to become (unintentionally) detached. When this happens and the shield drops to the ground, the shield will at least become dirty and require cleaning. More frequently, however, the shield becomes damaged in some way, e.g. deformed by impacting the ground. If the detachment of the shield is not noticed, or if it occurs while the user stands on the verge of a drop-off or of a body of water, the shield is lost permanently. Even if the shield is subsequently recovered, its unintentional detachment may occur just when the photographer uses the flash (or just prior thereto), so that the desired lighting effect is not obtained and a (possibly priceless) photograph is spoiled.

SUMMARY OF THE INVENTION

It is an object of the invention to overcome the prior disadvantages.

More particularly, it is an object of the invention to provide an improved photo flash device which is not possessed of these disadvantages.

Another object is to provide such a device where the wide-angle shield is permanently a part of the device, i.e. cannot accidentally become detached and damaged or lost.

A further object is to provide a device of the kind in question which has a built-in storage facility in which the wide-angle lens is located when not in use.

A concomitant object is to provide such a device in which the wide-angle lens, when in its rest or inoperative position, will nor (or at most insignificantly) increase the overall size of the device.

In keeping with these objects and with others which will become apparent hereafter, one aspect of the invention resides, in a photo flash device, in a combination comprising a reflector bounding a space for a light source and having an open side; a light-transmissive first shield extending across the open side and permitting light from the source to issue from the open side over a first angle of emergence; a light-transmissive wide-angle second shield, and means mounting the wise-angle shield for movement into and out of an operating position in which it also extends across the open side and causes light from the source to issue from the open side over a second larger angle of emergence.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a front elevation of a wide-angle shield, showing an area of the same which is formed with prismatic elements;

FIG. 6 is a section on line VI—VI of FIG. 5;

FIG. 7 is a partly sectioned detail view, showing the hinged mounting of the wide-angle shield; and FIG. 8 is a fragmentary detail view, illustrating arresting means for arresting the wide-angle shield in a respective position thereof.

DESCRIPTION OF A PREFERRED EMBODIMENT

Figure 1:
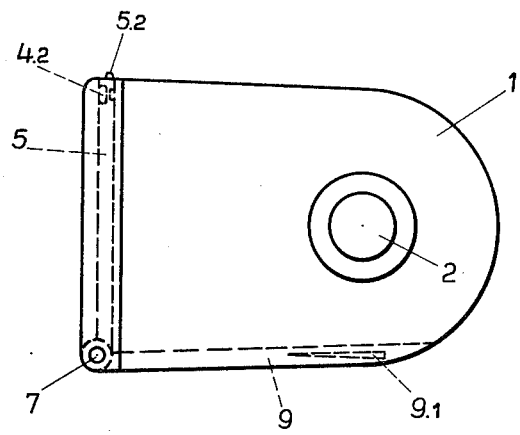
FIG. 1 is a somewhat diagrammatic side view, showing a reflector of a photo flash device according to the invention, with the wide-angle shield in operative position.

An embodiment of the invention is shown in FIGS. 1 - 8 by way of example. The photo flash device is not shown in its totality; only those portions which are necessary for an understanding of the invention. Those elements which are not illustrated are conventional and known per se.

With this in mind it will be seen that reference numeral 1 identifies a conventional reflector of a photo flash device. At its opposite lateral sides it has two bearings 2, 3 by means of which it is mounted on the housing or frame (not shown) of the photo flash device so as to be pivotable relative thereto. The interior of reflector 1 accommodates the usual light source (e.g. flash tube) and concave mirror. These are both conventional and therefore only the light source L has been shown (in phantom lines) in FIG. 4 for purposes of better orientation. The reflector 1 has an open sid (facing left in FIGS. 1 and 3) through which light from the source L is emitted; this open side is closed by a light-transmissive shield 4 (of glass or synthetic plastic material) to protect the mirror and source L against damage.

In accordance with the invention the reflector 1 is further provided with a light-transmissive wide-angle shield 5 (also of glass or, as shown, if synthetic plastic material). The shield 5 is provided with an area 6 in which it is formed with prismatic portions 6.1 serving to distribute and deflect the emerging light over an angle of emergence which is greater than that of the light emerging through the shield 4. Thus, light emerging through shield 5 will be spread over and illuminate an area which is larger than that illuminated by light passing through the shield 4. As shown in FIGS. 5 and 6, it is advantageous if the prismatic portions are of sawtooth-shaped configuration and are elongated at angles of about 45° relative to the axis of the light source L, i.e. relative to a straight line which passes through the center of the shield 5 and through the center of the source L. This further enhances the light distribution and the uniformity of illumination.

Figure 3:
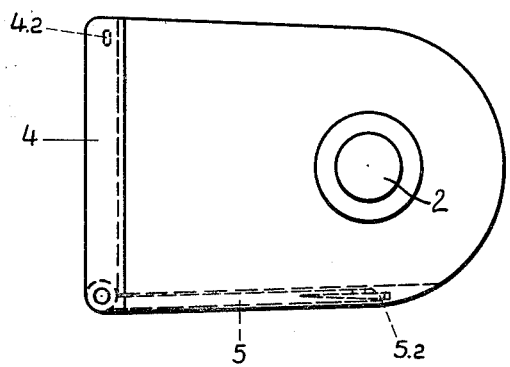
FIG. 3 is a view similar to FIG. 1 but showing the wide-angle shield in rest position.
Figure 2:
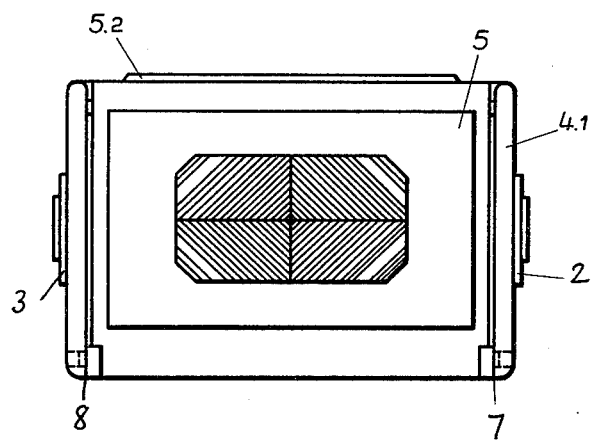
FIG. 2 is a front view of FIG. 1, i.e. as seen from the left in that Figure.
Figure 4:
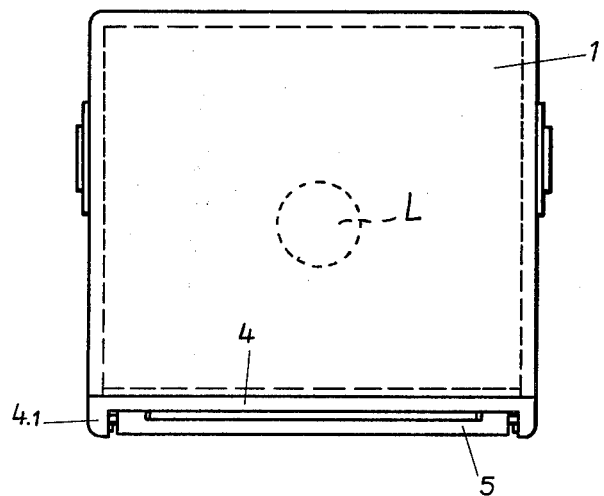
FIG. 4 is a front view of FIG. 3, i.e. as seen from the left in that Figure.

The shield 5 is hinged so that it can be pivoted relative to the reflector 1 between an operative position (FIGS. 1 and 2) and an inoperative or rest position (FIGS. 3 and 4). It is arrestable in both positions so that it can neither undesirably move out of nor enter into the operative position; this eliminates accidental interference with the light pattern desired by a user.

To hinge the shield 5 two journals 7 and 8 are provided. These include two journal recesses 7.1 and 8.1 which are formed in a frame 4.1 of the shield 4, and two journal pins 7.2 and 8.2 which are advantageously formed of one piece with the shield 5 and received in the recesses 7.1 and 8.1, respectively. The pins 7.2 and 8.2 are in longitudinal registry and together define a pivot axis about which the shield 5 can be pivoted to its operatuve position (FIG. 1) and its rest position (FIG. 3).

In the operative position the shield 5 extends substantially parallel to the shield 4, but is somewhat spaced from it. In this position two projections 5.1 formed on the shield 5 snap into dimples 4.2 formed in the lateral parts of frame 4.1 and arrest the shield 5 against undesired movement. When the shield is to be moved to its rest position, a user grips the handle or bar 5.2 (which could evidently have a different shape) and pivots the shield 5 about journals 7, 8 in downward direction and then up underneath the reflector 1 until it enters a shallow depression 9 which is formed for this purpose on the underside of the reflector 1. Sidewalls bounding the depression 9 are provided with detent ribs 9.1 (FIGS. 1, 2) behind which the projections 5.1 of the shield 5 snap when the shield is fully received in the depression 9. In this position the shield 5 is protected against loss and damage until its use is required, at which time the handle 5.2 is again used to pivot the shield to its operative position.

As mentioned before, the shield 5 is slightly spaced from the shield 4 and defines with the same a space or gap when in operative position. In accordance with another aspect of the invention, filter inserts (e.g. colored foils, diffusor foils, or the like) may be introduced into this space. For this purpose the reflector 1 may be provided (e.g. on the frame 4.1) with guides and or mounting elements for such filters. This makes it possible not only to illuminate differently-sized areas at the option of a user, but also to color the flash as desired (by using color foils) and/or to vary the contrast obtained (by using diffusor foils).

It is self-evident that more than one wide-angle lens may be provided, e.g. one to pivot into and out of the recess 9 at the underside of reflector 1 and another (offering a different lighting angle) to pivot into and out of a similar recess at the upper side of the reflector 1. Each of these lenses could be used by itself, or both of them might be used jointly to obtain still a further variation in the size of the illuminated area.

While the invention has been illustrated and described as embodied in a photo flash device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily, adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photo flash unit, a combination comprising a reflector bounding a space for a light source and having an open side; a light-transmissive first shield extending across said open side and permitting light from the source to issue from said open side over a first angle of emergence; a light-transmissive wideangle second shield; and means permanently mounting said wide-angle shield for pivotal movement into and out of an operating position in which it also extends across said open side and causes light from the source to issue from said open side over a second larger angle of emergence.

2. A combination as defined in claim 1, said means comprising at least one hinge mounting said wide-angle shield for pivotal movement to said operating position and to a rest position in which it is spaced from said open side.

3. A combination as defined in claim 2; and further comprising means for arresting said wide-angle shield in each of said positions.

4. A combination as defined in claim 2, said first sheild including a frame; and wherein said hinge pivotally mounts said second shield on said frame of said first shield so that the two shields together constitute a unit.

5. A combination as defined in claim 4, said frame having lateral portions provided with journal openings, and said second shield having journal pins each received in one of said journal openings.

6. A combination as defined in claim 1, said reflector having a surface formed with a depression; and said means comprising at least one hinge mounting said second shield for pivotal movement to said operating position and to a rest position in which it is received in said depression.

7. A combination as defined in claim 6, said depression having side walls and said first shield including a frame having lateral frame portions; and cooperating arresting portions on said side walls, lateral frame portions and second shield, so that said second shield is arrestable in the respective positions thereof by cooperation of the arresting portions on the second shield with the arresting portions on the side walls and lateral frame portions, respectively.

8. A combination as defined in claim 1, said second shield having an area formed with a plurality of prismatic portions which extend outwardly from the center of said second shield at an angle of substantially 45° relative to an axis passing through said center and through the light source.

9. A combination as defined in claim 8, wherein said prismatic portions are of sawtooth-shaped configuration.

10. A combination as defined in claim 1, said means comprising at least one hinge mounting said second shield for pivotal movement to said operating position in which it extends at least substantially parallel to said first shield but it spaced from the same to define therewith a space adapted to receive filter inserts.

11. A combination as defined in claim 10, said first shield including a frame; and further comprising means on said frame for mounting and grinding said filter inserts.

* * * * *